July 12, 1932.  J. MIHALYI  1,866,718
METHOD AND APPARATUS FOR FOCUSING LENSES
Filed May 14, 1930  3 Sheets-Sheet 2
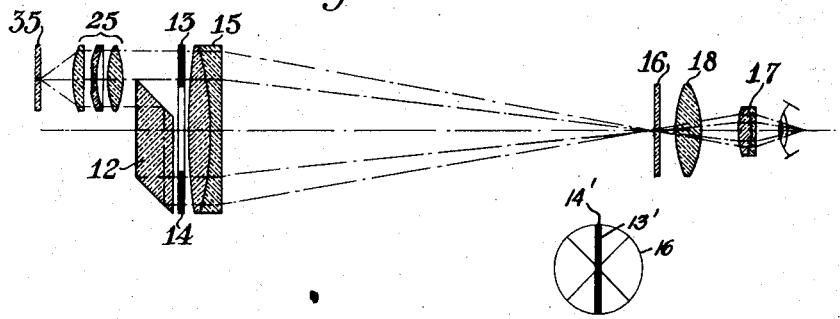
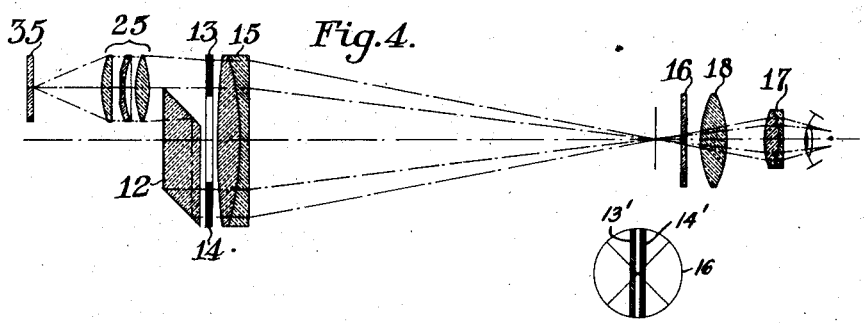
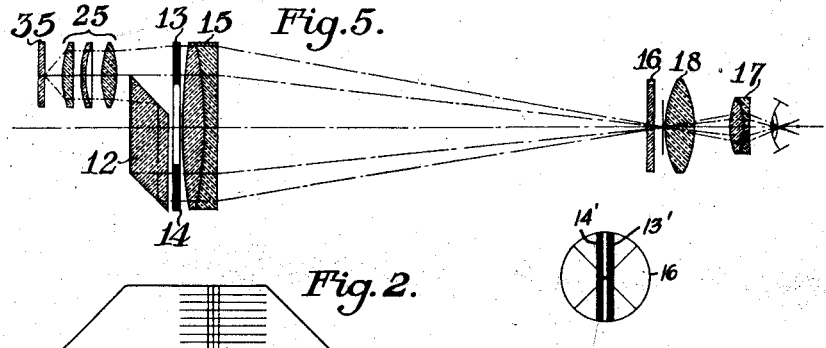
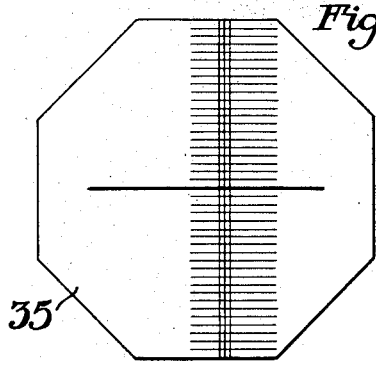
Inventor
Joseph Mihalyi, July 12, 1932.  J. MIHALYI  1,866,718
METHOD AND APPARATUS FOR FOCUSING LENSES
Filed May 14, 1930   3 Sheets-Sheet 3
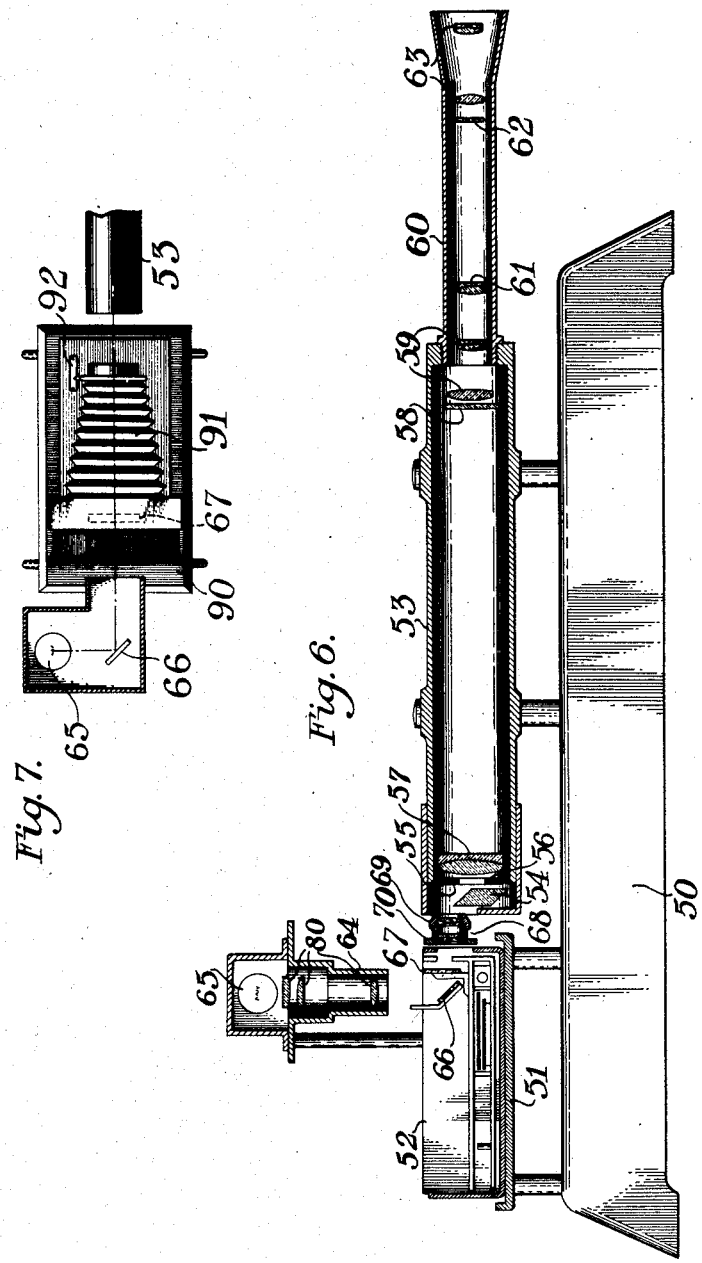
Inventor,
Joseph Mihalyi,
By
Attorneys Patented July 12, 1932

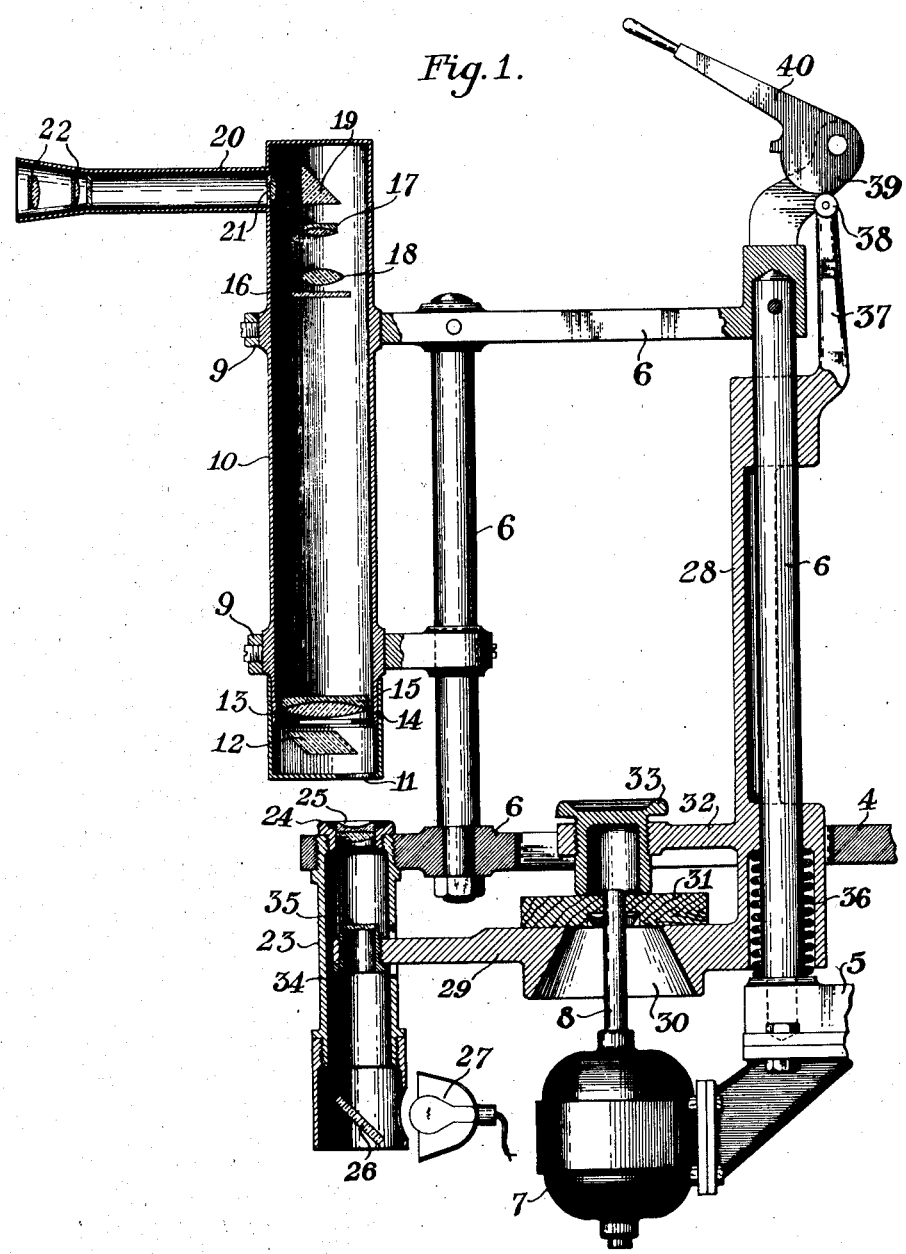

1,866,718

UNITED STATES PATENT OFFICE

JOSEPH MIHALYI, OF ROCHESTER, NEW YORK, ASSIGNOR TO EASTMAN KODAK COMPANY, OF ROCHESTER, NEW YORK, A CORPORATION OF NEW YORK

METHOD AND APPARATUS FOR FOCUSING LENSES

Application filed May 14, 1930. Serial No. 452,189.

This invention relates to the focusing of lens mounts and more particularly to the focusing of a lens to the film plane of the camera in which it is to be used.

Camera lenses, even among lenses of the same type, vary slightly in focal length so that it is necessary to adjust each lens to the camera in which it is to be used in order that a lens may focus on the film plane of the camera. In the past such lens adjustment has required the services of a skilled operator and even with such skilled adjustment there has been a deviation from the desired exact focus.

In accordance with the present invention a novel method and apparatus for adjusting lenses is provided whereby an unskilled operator may quickly and accurately adjust a lens or lens mount for the camera in which it is to be used.

In certain types of inexpensive cameras the lens is mounted in a shutter-board and since such lenses have varied slightly each from the other it has been the practice to make a threaded opening in the shutter-board and to mount the lens in a threaded metal shell which is screwed into the threaded opening in the board until the lens is focused on the film plane of the camera. The adjustment of the shell in the shutter-board has been a cut and try operation in which the operator would first screw the lens shell into the board a certain amount and would then observe if the lens was properly focused. Usually the operator would not hit upon the exact adjustment the first time so that it was necessary again to screw the metal shell into the shutter-board or slightly withdraw it and then observe the focusing of the lens again. This repeated change in adjustment and the subsequent observing of the focusing of the lens required a high priced operator who had to be trained for this particular job. In addition to the expense involved in mounting the lens in the threaded metal shell and screwing the shell into the shutter-board, there was the cost of preparing a threaded metal mount for the lens and preparing the screw thread opening in the shutter-board.

In accordance with the present invention it is proposed to bore the shutter-board to the proper distance for the lens to be mounted therein so that when the lens is fastened into the prepared bore it will be accurately focused on the film plane of the camera. An additional feature of the invention, therefore, involves a boring device for a shutter-board in combination with a visual indicator to show when the board has been bored to the proper distance for a lens to be used therewith. A further feature of the invention is the provision of a gauge in the form of an optical system including the lens to be mounted, in combination with a boring device for a shutter-board, so that the gauge will indicate when the shutter-board has been bored to the proper distance to receive and focus the lens to be mounted therein.

For a clearer understanding of the invention reference is made to the drawings in which Fig. 1 is a side elevation partially in section of a boring device for shutter-boards and an optical gauge cooperating therewith; Fig. 2 is a plan view of a slitted target for use in the optical system of Fig. 1; Figs. 3, 4 and 5 are diagrams useful in explaining the principle of the optical system of the device of Fig. 1 in which Fig. 3 indicates that the lens to be mounted is accurately positioned whereas in Fig. 4 the lens is too close to the film plane while in Fig. 5 the lens is positioned too far from the film plane; Fig. 6 is a modified form of the invention designed for use in focusing the lens mounts of a different type of camera; and Fig. 7 diagrammatically indicates how the invention may be used in focusing the lens of a folding type of camera.

Referring especially to Fig. 1, 4 designates a support such as a table or work bench, on the under side of which there is secured a bracket 5 to support a frame of the device generally designated 6. On this frame there is mounted a motor 7 with its shaft extending vertically to which there may be interchangeably secured cutters of various sizes such as 8. On the side of the frame there is adjustably mounted in brackets 9 a telescope 10. The lower end of the optical tube of this telescope has an eccentric opening 11 above which there is mounted a rhomboid prism 12 to overhang a portion only of this opening. There are also supported in this tube directly above the prism a green filter 13 and a red filter 14. The color of these filters, however, is not limited to those mentioned but any pair of complementary colors may be used. In the lower end of the telescope and directly above the color filters there is supported a wide aperture objective 15 while in the upper part of the optical tube there is provided a reticule 16 having cross lines thereon and above this element there are provided lenses 17 and 18 constituting an eye piece. Since it is not convenient for an operator to observe the optical field by viewing it vertically, a prism 19 is utilized to bend the light rays so they are visible through the horizontal optical tube 20 which in effect is a second telescope including an objective 21 and the lens elements 22 forming an eye piece. In addition to the advantage of enabling the operator to view the lens adjustment horizontally, the combination of the two telescopes just described prevents the formation of parallax by the slight movement of the operator's head, since the field of vision is thus very materially restricted. On the lower part of the frame 6 there is mounted another optical tube 23 in the upper part of which there is fastened an adjustable adapter ring 24 to receive the lens 25 which is to be focused. In the lower end of the optical tube 25 there is supported an inclined mirror 26 by means of which light from the source 27 may be reflected through the lens 25. The frame 6 also has mounted thereon for vertical movement a movable member generally designated 28, the lower end of which has an arm 29 with an opening 30 therein on which arm a shutter-board 31 to be bored, is supported. Directly above the arm 29 there is provided on the member 28 a second arm 32 having an adjustable clamp 33 by which the shutter-board 31 may be firmly clamped against the arm 29. The free end of the arm 29 extends through on opening in the side of the optical tube 23 and has adjustably secured thereto a hollow tube 34 to which there is fastened a slit target 35. This target is preferably in the form of a glass mirror with lines scratched through the mirrored portion describing a pattern such as that indicated in Fig. 2. In this figure it will be noted that vertical and horizontal lines are provided which in addition to providing a plurality of observation lines that are readily visible to the operator, also serve to indicate when a lens is defective as is shown for example by a distortion of these lines in case the lens is eccentric. The movable member 28 is normally held in the position shown in Fig. 1 by the spring 36 bearing at one end on the bracket 5 and at its other end on the member 28. This member is also provided with a vertically extending arm 37 terminating in a roller 38. On the extension of the frame, there is pivoted a cam 39 actuated by a handle 40 to cause the cam 39 to engage the roller 38.

The optical system of Fig. 1 will best be understood by referring to Figs. 3, 4 and 5. Light from the source 27 is reflected by the mirror 26 (Fig. 1) on the slitted target 35. Rays passing through the slits in this target and the lens 25 to be focused are split by the rhomboid prism 12 whereby a portion of each ray passes directly through the green filter 13 while the other portion of the ray enters the rhomboid prism 12 and is transferred thereby through the red filter 14 to the opposite side of the objective 15. The reticule 16 provided with cross lines is positioned in the infinity plane of the objective 15 while the lenses 17 and 18 constitute an eye piece that may be readily focused to accommodate for eye variations of different operators. Rays passing through the slits are split and displaced by the rhomboid prism so that they enter the pupil of the objective wherein separate images 13' and 14' of the slits are formed which will appear superimposed in the field of view of the telescope providing the rays emerging from the lens 25 are parallel when they approach the telescope objective. When the two images are thus superimposed as indicated in Fig. 3 the lens 25 is accurately focused.

Thus in focusing a camera lens to its required setting, it should then follow that by now placing a camera to be focused with its lens adjacent and approximately in line with the entering pupil of the reading telescope objective and having an illuminated slit target in the focal plane of the camera, rays passing through the slits will be projected through the camera lens, and the telescope objective in turn forms two separate red and green images of the slit target in the field of view. When the rays of light connecting both the camera lens and the objective are parallel they will appear superimposed in the field of view of the telescope showing that the camera lens is in proper focus.

Thus as shown in Fig. 3 the camera lens is in proper focus so that parallel rays of light reach the reading telescope lens and the split images appear superimposed in the field of view. However, in Fig. 5 the lens 25 is too close to the film plane so that diverging rays of light emanating from the lens 25 reach the base lens of the telescope and double slit images 13' and 14', as distinguished from superimposed images, are formed in the field of view. Fig. 4 indicates the condition when the camera lens is out of focus by reason of being too far from the film to the plane so that converging rays of light reach the base lens of the telescope and separate split images 13' and 14' are formed in the field of view. In this instance the green slit 13' will appear opposite in position to its position shown in Fig. 5, indicating to the operator at a glance, in which direction the lens is required to be moved in order to obtain the proper focus.

Since the diverging rays emanating from the slit appear to the associated optical system as an independent source and is generally referred to as a secondary light source, it is obvious that the operation of the device is functionally indifferent to the type of source used and where in the claims the term "light source" or "light from a source" is used, it is meant to include either a primary source or a secondary source. In other words, the light source is the point of origin of the rays which the optical system images on the reticule.

The operation of the device of Fig. 1, to bore a shutter-board to the exact depth to receive a given lens and focus it for use in a given camera, is as follows. The operator inserts a lens 25 in the adapter ring 24 and then places a shutter-board 31 to be bored, on the arm 29 where it is fastened in place by the clamp 33. The operator, while peering into the eye piece 22 of the optical system, then depresses the arm 40 which through the action of the cam 39 and roller 38 forces the member 29 downward carrying with it the shutter-board 31 to engage the cutter 8. As the shutter-board 31 descends, it engages the cutter 8 which cuts into the board 31 and at the same time the slit target 35, also carried by arm 29, moves away from lens 25. The operator continues to depress this handle and thereby continues to increase the depth of the bore, until he observes that the red and green images 13' and 14' of the target slit, visible in the eye-piece 22, are in superimposed relation as indicated in Fig. 3. He then releases the handle 40, and spring 36 elevates arm 29 to disengage the shutter-board 31 from the cutter since at this time the opening in the board 31 has been cut to the proper depth so that when the lens 25 is mounted therein it will focus on the film plane of the camera. The interior of the fresh bore is now blackened and thereafter the lens 25 is fastened in this bore. The shutter-board with its lens properly focused therein is now ready to be assembled into a camera.

In Fig. 6 a modified form of the invention is shown, suitable for use with certain other types of cameras in which it is customary to space the wall of the camera on which the lens is mounted at an exact distance from the film plane of the camera. It then becomes necessary that the lens unit be accurately adjusted so that when mounted on the camera it will focus exactly on the film plane of the camera. In the patent to Wittel 1,690,607, granted November 6, 1928 there is shown a lens mount in which the lens elements may be quickly and accurately adjusted by varying the position thereof so that the lens unit will be in focus even though it is mounted on any camera of the same type. In this modified form of the invention adapted to indicate the proper adjustment of the lens mount of this patent, 50 designates a base on one end of which there is mounted a table 51 serving to support a dummy camera casing 52. On the other end of this base, there is mounted a telescope having an optical system similar to that shown in Fig. 1 and diagrammatically represented in Figs. 3, 4 and 5. This telescope at its left hand end has an eccentric opening partially covered by the rhomboid prism 54. Following this prism a red filter 55 and a green filter 56 are positioned before the objective 57. At the other end of the telescope, there is mounted a reticule 58 provided with cross lines, and eye piece lenses 59. As in the case of the optical system of Fig. 1, a second telescope 60, in this instance, having its axis in common with the telescope 53, is provided and this second telescope has an objective 61, a second reticule 62 and the eye-piece including lenses 63. On the table 51 there is also mounted on a bracket, an illuminating system 64 comprising the light source 65 and a series of lenses 80 for concentrating the light on an inclined mirror 66. A slit target 67 similar to target 35 is mounted in the film plane so that light from the inclined mirror 66 is reflected through the slits of the target and through the opening in the left hand end of the telescope. A lens unit 68, of the type disclosed in the mentioned patent, comprising the adjustable elements 69 and 70, may be supported in any well-known manner in front of the opening of the telescope so that the operator while looking through the telescope may vary the adjustment of the elements 68 and 69 until the rays passing through this lens appear as superimposed red and green lines as indicated in the diagram of Fig. 3. When this adjustment is reached, the operator knows that the lens unit 70 is properly focused for use with any camera of the same type.

As diagrammatically indicated in Fig. 7 the present device may also be used for focusing a folding type camera. In this form of the invention a table 90 replaces the table 51 of Fig. 6, which table includes a fixture for supporting a folding camera generally designated 91 with the target 67 in the focal plane thereof. In this instance also light from the source 65 is reflected by the inclined mirror 66 through the slits of the target 67 and the lens of the camera into the telescope 53 which includes the rhomboid prism, the color filters and the remainder of the optical system as shown in Fig. 6. In focusing the camera the bellows thereof is moved until the camera lens is shown by the optical system to be in focus, at which time the scale 92 is fastened on a related portion of the camera.

The present disclosure is merely illustrative of several embodiments of the invention and there may be many variations and modifications thereof within the scope of the appended claims, without departing from the spirit of the invention.

What I claim is:

1. The method of focusing a lens to a given focal plane which comprises passing a ray of light from a source through the lens to be focused, splitting the ray of light, passing one portion of the split ray through a medium of one character, passing the other portion of the split ray through a medium of another character, adjusting the distance between said source and said lens until said split portions of the ray appear as parallel rays.

2. The method of focusing a lens to a given focal plane which comprises passing a ray of light from a restricted source in the focal plane through the lens to be focused, splitting the ray of light, translating one portion of the split ray to a ray of one color, translating the other portion of the split ray to a ray of another color, adjusting the distance between the restricted source and said lens until said split portions of the ray are parallel, and projecting said colored rays onto a surface on which they may be observed.

3. The method of focusing a lens to a given focal plane which comprises passing a ray of light from a source through the lens to be focused, splitting the ray of light, translating one portion of the split ray to a ray of one color, translating the other portion of the split ray to a ray of another color, projecting said rays on a surface where they may be observed and adjusting the distance between said source and said lens until said colored rays appear to be superimposed.

4. The method of focusing a lens to a given focal plane which comprises passing a ray of light from a source to the lens to be focused, splitting the ray of light, translating one portion of the split ray to a ray of one color, translating the other portion of the split ray to a ray of another color, telescopically observing said rays, and adjusting the distance between said source and said lens until said colored rays appear to be superimposed when viewed telescopically.

5. The method of focusing a lens to a given focal plane which comprises passing a ray of light from a restricted source to the lens to be focused, splitting the ray of light, translating one portion of the split ray to a ray of one color, translating the other portion of the split ray to a ray of another color, telescopically observing said rays, and moving said light source to change the distance between said lens and said source until said colored rays appear to be superimposed when viewed telescopically.

6. The method of indicating that a shutter-board of a camera is bored to the proper distance for a given lens so that when said lens is mounted in said board it will focus on the film plane of said camera, which comprises boring the shutter-board, simultaneously projecting rays of light from a light source through said lens while correspondingly changing the distance between said light source and said lens in accordance with the changing depth of the bore, until rays from said source emerge from said lens as parallel rays.

7. The method of indicating that a shutter-board of a camera is bored to the proper distance for a given lens so that when said lens is mounted in said bore it will focus on the film plane of said camera, which comprises boring the shutter-board, simultaneously projecting rays from a light source through said lens in a fixedly mounted position while correspondingly changing the position of said light source with respect to said lens in accordance with the changing depth of the bore until rays from said source emerge from said lens as parallel rays.

8. The method of indicating that a shutter-board of a camera is bored to a proper depth for a given lens so that when said lens is mounted in said bore it will focus on the film plane of said camera, which comprises supporting said lens in a stationary position, boring the shutter-board, simultaneously projecting rays of light from a restricted light source through said lens, splitting the rays passing through said lens, characterizing each portion of a split ray in a distinctive manner, viewing said rays while changing the distance between said source and said lens in accordance with the changing depth of the bore until the split portions of each ray appear to be superimposed when viewed telescopically.

9. A device for boring a shutter-board of a camera to the proper depth so that a lens mounted therein will focus on the film plane of a camera in which the shutter-board is assembled, comprising a frame, a cutter and driving means therefor mounted in said frame, a support for a shutter-board mounted in cutting relation to said cutter, a lens support mounted in said frame for a lens to be mounted in the bore prepared in a shutter-board by said cutter, a light source for transmitting rays of light through said lens, and means for changing the relative distance between said cutter and said support and for correspondingly changing the distance between said light source and said lens until light from said source emerges from said lens as parallel rays.

10. A device for boring a shutter-board to the proper depth to receive a given lens so that said lens will focus on the film plane of a camera when the shutter-board is assembled therein, comprising a frame, a cutter and driving means therefor fixedly mounted in said frame, a support for the shutter-board to be bored, movably mounted in cutting relation to said cutter, a fixed lens support for a lens to be mounted in the bore prepared in a shutter-board by said cutter, a light source for transmitting rays through said lens, said light source being movably mounted, and means for correspondingly moving said support and said light source until light from said source emerges from said lens as parallel rays.

11. A device for boring a shutter-board to the proper depth to receive a given lens so that said lens will focus on the film plane of a camera when the shutter-board is assembled therein, comprising a frame, a cutter and driving means therefor fixedly mounted in said frame, a support for the shutter-board to be bored, movably mounted in cutting relation to said cutter, a fixed lens support for a lens to be mounted in the bore prepared in a shutter-board by said cutter, a light source for transmitting rays through said lens, said light source being movably mounted, means for correspondingly moving said support and said light source, and an optical system mounted in a position to ascertain when the light rays from said source passing through said lens emerge as parallel rays.

12. A device for boring a shutter-board to the proper depth to receive a given lens so that said lens will focus on the film plane of a camera when the shutter-board is assembled therein, comprising a frame, a cutter and driving means therefor fixedly mounted in said frame, a support for the shutter-board to be bored, movably mounted in cutting relation to said cutter, a fixed lens support for a lens to be mounted in the bore of said shutter-board prepared by said cutter, a light source for transmitting rays through said lens, said light source being movably mounted, means for correspondingly moving said support and said light source, and an optical system mounted in a position to ascertain when the light rays from said source passing through said lens emerge as parallel lines, said optical system comprising means for splitting each of said rays of light, a medium of one distinctive character through which one portion of the split ray is passed, a medium of a second distinctive character through which the other portion of each ray passes, and telescopic means for determining when the distinctively characterized split rays emerge parallelly from the lens to be focused.

13. A device for boring a shutter-board to the proper depth to receive a given lens so that said lens will focus on the film plane of a camera when the shutter-board is assembled therein, comprising a frame, a cutter and driving means therefor fixedly mounted in said frame, a support for the shutter-board to be bored, movably mounted in cutting relation to said cutter, a fixed lens support for a lens to be mounted in the bore of said shutter-board prepared by said cutter, a primary light source for transmitting rays through an apertured diaphragm and said lens, said diaphragm being movably mounted, means for correspondingly moving said support and said diaphragm, and an optical system comprising a rhomboid prism for splitting the rays emerging from said lens, a light filter of one color through which one portion of the split ray is passed, a light filter of another color through which another portion of the split ray is passed, and a telescope in which the differently colored rays appear to be superimposed when they enter the lens system of the telescope as parallel rays.

Signed at Rochester, N. Y., this 9th day of May, 1930.

JOSEPH MIHALYI.